JEAN ELIE RICHARD.
Improvement in Water Gages.
No. 121,661.  Patented Dec. 5, 1871.
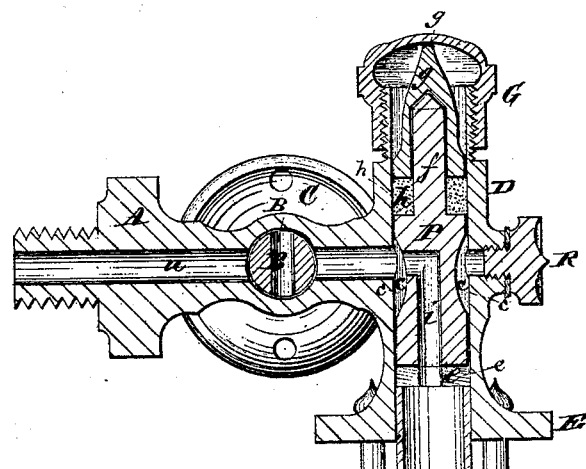
Fig. 1.
Fig. 2.
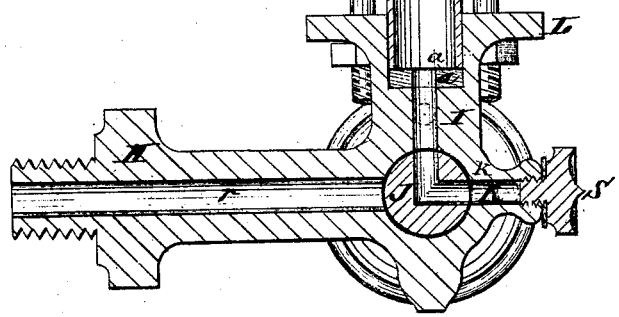

UNITED STATES PATENT OFFICE.

JEAN ELIE RICHARD, OF COLUMBIA, SOUTH CAROLINA.

IMPROVEMENT IN WATER-GAUGES.

Specification forming part of Letters Patent No. 121,661, dated December 5, 1871.

*To all whom it may concern:*

Be it known that I, JEAN ELIE RICHARD, of Columbia, in Richland county and State of South Carolina, have invented certain new and useful Improvements in Fluid-Gauges; and I do hereby declare that the following is a full, clear, and exact description thereof, reference being had to the accompanying drawing through letters of reference marked thereon, in which—

Figure 1 represents a vertical longitudinal section of a gauge constructed according to my improvement. Fig. 2 is an elevation of the adjustable luting-plug, in a modified form, for making the joint between the metal portions and the glass tube.

The same letters indicate like parts in both figures.

My invention consists in constructing the upper portion with a cylindrical passage sufficiently large to admit of the insertion of the glass tube therethrough from its upper end, and in combination therewith an incased plug for forming the water or steam-tight joint by packing of a flexible character bearing on either end of the glass tube, as contradistinguished from annular packing-rings $a$ round such tube, which are apt to cause unequal expansion and consequent cracking of the glass, and with suitable passages through said plug for communication at its upper end with the boiler or other vessel to which it may be attached; said gauge, as a whole, being provided with stop-cocks at both upper and lower ends to admit of the removal of the glass portion at any time, whether under pressure or otherwise.

To enable others to make and use my invention I will further describe it by referring to the drawing, in which—

A represents the upper connection, with the boiler provided with a stop-cock, B, controlled by a disk or lever, C, and provided at its outer end with a vertical cylindrical portion, D, having a flange, E, at its lower end, and a screw-thread at its upper end for the reception of a cap or plug, G, by which it is closed at said upper end. The lower connection H is of corresponding length with the connection A to the center of its upwardly-extending branch I, and is provided at the angle with a stop-cock, J, the plug of which has a right-angular passage, so that by turning said plug the fourth of a revolution connection may be established between the vessel and the glass tube N, or between said tube and the drain-plug aperture K, for the purpose of drawing off or blowing out the gauge. This connecting portion is also provided with a flange, L, corresponding with the flange E of the upper connection, and by which, when in place, the two portions are stayed by bolts M. The glass tube N is then inserted through the tubular portion D of the upper connection, and seated on an elastic packing, $a$, within the cup portion of the flange L; an elastic packing, $e$, is then inserted at the upper end of the tube N, and the plug P, which is constructed to fit the cylindrical portion D, or thereabout, is inserted on top of said packing $e$. The plug P is constructed with an aperture, $i$, and annular cavity $c$ around its lateral opening, forming a communication between the tube N and the lateral passage $u$ in the upper connecting piece A. This plug is also constructed with a tapering upper end, $d$, as represented in Fig. 2, or may be made with a stem, $f$, and conical cap $g$, as represented in Fig. 1, whereby a flexible packing, $h$, may be introduced and compressed within the upper end of the cylindrical portion D by means of the screw-cap G bearing upon the upper end of said cone $g$. Plugs R and S are inserted in the upper and lower fixtures A H, whereby steam or water, as desired, by proper arrangement of the stop-cocks B and J, may be blown through the glass tube N for the purpose of cleansing the latter; or in case of fracture of said tube—the stop-cocks being arranged as represented in the drawing, and the cap G removed—the tube N may be taken out through the cylinder D and replaced with another.

When in use the stop-cocks are to be turned to establish communication between the glass tube N and the passages $u$ and $r$ in the upper and lower connections A and H. The height of the liquid will then be indicated in the glass tube as in all other fluid gauges.

What is here claimed and desired to be secured by Letters Patent, is—

The combination of the plug P with the cylincal portion D and its cap G, whether said plug be constructed as in Fig. 1 or 2, substantially as shown and described.

JEAN ELIE RICHARD.

Witnesses:
D. B. MILLER, Jr.,
JNO. M. MILLER.

(148)